United States Patent [19]

Schäfer et al.

[11] Patent Number: 5,685,565
[45] Date of Patent: Nov. 11, 1997

[54] COLLAPSIBLE INTERMEDIATE STEERING SHAFT

[75] Inventors: Burkhard Schäfer, Ganderkesee; Kai Uwe Grams, Cappeln; Olaf Szielasko, Stemwede, all of Germany

[73] Assignee: Lemförder Metallwaren AG, Lemförde, Germany

[21] Appl. No.: 589,881

[22] Filed: Jan. 23, 1996

[30] Foreign Application Priority Data

Feb. 8, 1995 [DE] Germany ................ 195 04 036.8

[51] Int. Cl.⁶ ........................................... B62D 1/19
[52] U.S. Cl. ................. 280/777; 74/492; 403/377; 464/183
[58] Field of Search ..................... 280/777, 775; 74/492, 493; 464/162, 179, 181, 183; 403/2, 265, 377, 378; 188/371, 376

[56] References Cited

U.S. PATENT DOCUMENTS 3,373,629  3/1968  Wight et al. .................. 280/777
5,228,720  7/1993  Sato et al. .................... 280/777
5,477,750  12/1995 Korzan ........................ 280/777

FOREIGN PATENT DOCUMENTS 62-175260  7/1987  Japan ......................... 74/492
6-156289   6/1994  Japan ......................... 74/492

Primary Examiner—Brian L. Johnson
Assistant Examiner—Peter C. English
Attorney, Agent, or Firm—McGlew and Tuttle

[57] ABSTRACT

The present invention pertains to a safety system for steering shafts, in which shaft parts non-rotatably engage each other and are secured against relative displacement in relation to one another by injected shear materials, which are designed for maximum axial forces in the steering shaft and engage recesses on the outer circumference of the inner shaft part and on the inner circumference of the outer shaft part. Such a safety system has an at least double telescoping shaft system, in which at least two shaft parts are connected to one another by an intermediate shaft part, and the inner shaft parts engage a radial expansion of the corresponding outer shaft part, and a cross section of the shear material designed for shearing is arranged between the shaft parts in the area of the expansion.

6 Claims, 2 Drawing Sheets

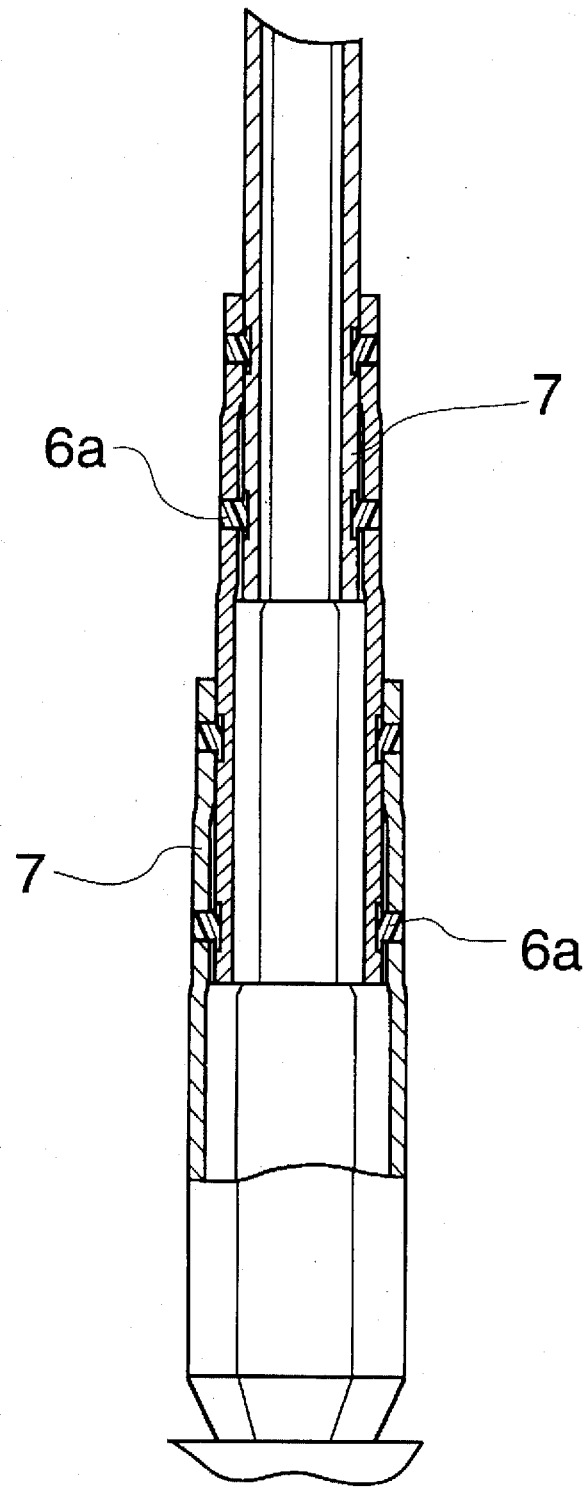

COLLAPSIBLE INTERMEDIATE STEERING SHAFT

FIELD OF THE INVENTION

The present invention pertains to a safety system for steering shafts, in which shaft parts non-rotatably engage each other and are secured against axial displacement in relation to one another by injected shear materials, the shear materials being designed for maximum axial forces in a steering shaft and the shear materials equally engage recesses on an outer circumference of an inner shaft part and on an inner circumference of an outer shaft part.

BACKGROUND OF THE INVENTION

Such safety systems have the task of no longer transmitting axial forces when the forces exceed a predetermined amount, so that rupture will occur in the line of the steering shaft at a predetermined point. Such safety systems are preferably arranged in an intermediate shaft between the steering gear and the bottom joint of a steering column of adjustable slope or the bottom fastening means of a fixed steering column. Simple telescopic intermediate shafts, in which one shaft part is fixed axially to the housing of the steering gear and the other shaft part is fixed axially to the bottom joint of an adjustable steering column or to a fixed steering column have been known. The two free ends of the shaft parts telescopically engage each other and are connected to one another by a safety member transmitting axial forces. Injection-molded plastics or injection moldings made of another deformable shear material are frequently used for this purpose. These injection moldings engage, on the one hand, recesses on the outer circumference of the inner shaft part and, on the other hand, recesses on the inner circumference of the outer shaft part, and the latter recesses are passed through completely or at least at some points to the outer jacket surface of the outer shaft part in order to make possible the injection of the shear material. Only a relatively short axial displacement is possible between the two shaft parts especially in the case of intermediate shafts of short overall length if the predetermined shearing force is exceeded, e.g., in the case of a collision of the vehicle with an obstacle.

SUMMARY AND OBJECT OF THE INVENTION

The primary object of the present invention is to provide a design of a safety system for steering shafts which non-rotatably engage each other and are secured against axial displacement in relation to one another by injected shear materials, the shear materials being designed for maximum axial forces in a steering shaft and the shear materials equally engage recesses on an outer circumference of an inner shaft part and on an inner circumference of an outer shaft part in order to achieve a considerable increase in the axial displacement of the shaft parts non-rotatably engaging each other and to ensure a so-called fail-safe behavior, and, in addition, to achieve that the function of the safety system also remains intact if the injection molding connecting the shaft parts to one another is unintentionally shorn off.

According to the invention, a safety system for steering shafts is provided in which shaft parts non-rotatably engage each other and are secured against axial displacement in relation to one another by injected shear materials. The injected shear materials are designed for maximum axial forces in the steering shaft. The injected shear materials equally engage recesses on the outer circumference of the inner shaft part and on the inner circumference of the outer shaft part. The shaft parts are provided at least in a double telescoping shaft system in which the at least two shaft parts are connected to one another axially by an intermediate shaft part. The inner shaft part engages a radial expansion of the corresponding outer shaft part. A cross section of the shear material, designed for shearing at a certain force level, is arranged between the two shaft parts in the area of the radial expansion.

A considerable increase in the so-called crash path can be achieved even in a double telescoping shaft system, and the design according to the present invention ensures that the shaft parts cannot fall apart in the axial direction even after the rupture of the shear material, so that a fail-safe behavior is guaranteed. A special problem is represented in double telescoping shaft systems by the middle shaft part between the two end shaft parts, which could slide down axially from the end shaft parts after an unintended rupture of the shear materials without the design according to the present invention, so that an interruption of the shaft system occurs at one point in time. This is prevented by the inner shaft parts engaging a radial expansion of the corresponding outer shaft part, wherein the cross section of the shear material between the shaft parts, which cross section is designed for shearing in the case of an axial force exceeding a maximum axial force, is also arranged in the area of this expansion, i.e., outside the external diameter of the inner shaft part.

In analogy to prior-art designs, the shaft parts engaging each other may have a plurality of connections formed by shear materials arranged at axially spaced locations from one another, one of which is arranged in the area of the inner expansion and one in the area of the smallest internal diameter of the outer shaft part.

In a preferred embodiment, an intermediate steering shaft arranged between the steering gear and the bottom joint of a steering column of adjustable slope is designed, in a double telescoping manner, with a tubular shaft part between a shaft part axially fastened to the steering gear and a shaft part axially fastened to the bottom joint of the steering column of adjustable slope. The features of the present invention can also be applied to steering columns with intermediate steering shafts, in which one axially telescoping step is provided in a lower intermediate shaft between the steering gear and the bottom joint of a steering column, and the other telescoping step is provided directly in the steering column.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a partially sectional view of the shaft parts among each other in a sectional plane passing through the longitudinal axis on a larger scale compared with FIG. 1.

DESCRIPTION OF THE PREFERRED EMBODIMENT

Figure 1:
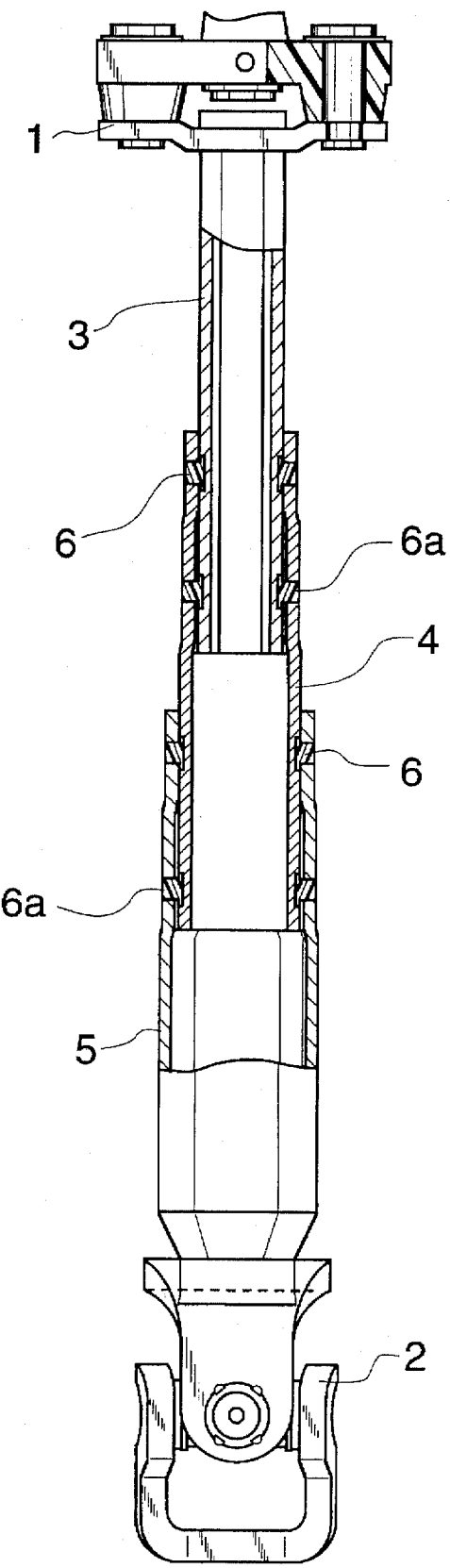
FIG. 1 is partially a front view and partially a sectional view at a plane passing through the longitudinal axis of an intermediate shaft of a motor vehicle between the steering gear and the lower end of a steering column.

The intermediate shaft shown as an exemplary embodiment is connected at the lower end to the steering gear, not shown, by a universal joint 1. The top end of the intermediate shaft is connected by another universal joint 2 to the steering shaft in a steering column, likewise not shown. The intermediate shaft system is comprised of three shaft parts 3, 4, and 5, of which the lower shaft part (first system end shaft part) 3 is fixed with one end axially to the universal joint 1, and the top shaft part (second system end shaft part) 5 is fixed with one end axially to the universal joint 2. The other two ends of the shaft parts 3 and 5 are non-rotatably connected to one another by a tubular intermediate part 4. This is achieved, e.g., by non-round cross sections of the individual shaft parts. The transmission of axial forces is achieved by so-called injection moldings 6, 6a which consist of, e.g., a plastic or another, suitable shear material and engage recesses on the outer circumference of the inner shaft part, on the one hand, and recesses on the inner circumference of the outer shaft part, on the other hand, as it appears more clearly from FIG. 2. At one point or even at a plurality of points of the circumference, the recesses of the outer shaft end pass through to the outer circumferential surface of the shaft end to make it possible to introduce the shear material. The outer shaft end has a radially expanding expansion 7 in the area of the engaging inner shaft end, as can be recognized from FIG. 2. The cross section of the shear material in the injection moldings 6, 6a which cross section is designed for shear, is also located in the area of this radially expanding expansion 7. A radially projecting bead, which is movable only in the area of the radial expansion of the outer shaft part, remains on the inner shaft part in the case of rupture of the shear material in the injection moldings arranged within these expansions, so that the shaft parts cannot fall apart axially. The middle tubular shaft part 4 is secured, in particular, so that it is secured against a displacement causing the axial interruption of the intermediate shaft.

By the provision of expansion 7 and radially projecting beads provided on an inner end of the various shafts, the shaft system allows axial movement, for example in the case of a crash or the like but prevents the shafts 3, 4 and 5 from becoming disassociated from one another.

While a specific embodiment of the invention has been shown and described in detail to illustrate the application of the principles of the invention, it will be understood that the invention may be embodied otherwise without departing from such principles.

What is claimed is:

1. A safety system for a steering shaft, comprising an at least double telescoping shaft system including at least a first end shaft connected to a second end shaft via an intermediate shaft, said first end shaft having an inner shaft part, within an outer shaft part of said intermediate shaft, said first end shaft inner shaft part being connected to said intermediate shaft at a radial expansion of said intermediate shaft by first injected shear material means, said intermediate shaft having an inner shaft part within said second end shaft, said intermediate shaft inner shaft part being connected to an outer shaft part of said second end shaft at a radial expansion of said second end shaft by second injected shear material means, said first injected shear material means and said second injected shear material means including injected shear material engaging recesses on an outer circumference of an associated inner shaft part and on an inner circumference of an associated outer shaft part, a cross section of said shear material being designed for shearing at maximum axial forces in the steering shaft and being arranged between an associated inner shaft part and an associated outer shaft part in an area of an associated said radial expansion.

2. A safety system according to claim 1, wherein said first shear material means and said second shear material means include a plurality of connections including shear material arranged at axially spaced locations from one another including a shear material connection arranged at an associated said expansion and a connection arranged at a smallest internal diameter of an associated outer shaft part.

3. A safety system according to claim 1, wherein said second shaft is fixed axially to a bottom joint of a steering column of adjustable slope and said first shaft is fixed axially to a steering gear.

4. A steering shaft safety system, comprising:

a first system end shaft;

an intermediate shaft having an intermediate shaft radial expansion;

a second system end shaft having a second system end shaft radial expansion, said first system end shaft being connected to said second system end shaft via said intermediate shaft to form an at least double telescoping shaft system, said first system end shaft having an inner shaft part, within an outer shaft part of said intermediate shaft;

first injected shear material means for connecting the inner shaft part of said first system end shaft to the outer shaft part of said intermediate shaft at said radial expansion of said intermediate shaft, said first injected shear material means including injected shear material engaging recesses on an outer circumference of said inner shaft part of said first system end shaft and on an inner circumference of said outer shaft part of said intermediate shaft, a cross section of said shear material being designed for shearing at maximum axial forces in the steering shaft;

second injected shear material means connecting an inner shaft part of said intermediate shaft to an outer shaft part of said second system end shaft at said radial expansion of said second system end shaft, said second injected shear material means including injected shear material engaging recesses on an outer circumference of said inner shaft part of said intermediate shaft and on an inner circumference of said outer shaft part of said second system end shaft, a cross section of said shear material being designed for shearing at maximum axial forces in the steering shaft.

5. A safety system according to claim 4, wherein said first shear material means and said second shear material means include a plurality of connections including shear material arranged at axially spaced locations from one another including a shear material connection arranged at an associated expansion and a connection arranged at a smallest internal diameter of an associated outer shaft part.

6. A safety system according to claim 4, wherein said second shaft is fixed axially to a bottom joint of a steering column of adjustable slope and said first shaft is fixed axially to a steering gear.

* * * * *